No. 787,806. PATENTED APR. 18, 1905.
H. TORGERSON.
FISH HOOK.
APPLICATION FILED AUG. 3, 1904.

No. 787,806. Patented April 18, 1905.

UNITED STATES PATENT OFFICE.

HALVOR TORGERSON, OF KELVIN, NORTH DAKOTA.

FISH-HOOK.

SPECIFICATION forming part of Letters Patent No. 787,806, dated April 18, 1905.

Application filed August 3, 1904. Serial No. 219,382.

*To all whom it may concern:*

Be it known that I, HALVOR TORGERSON, a citizen of the United States, residing at Kelvin, in the county of Rolette, State of North Dakota, have invented certain new and useful Improvements in Fish-Hooks; and I do hereby declare the following to be a full, clear, and exact description of the invention, such as will enable others skilled in the art to which it appertains to make and use the same.

This invention relates to hooks, and more particularly to those used in fishing, and has for its object to provide a hook designed especially for "snagging"—that is, a hook designed for use without bait—by which the fish is caught by quickly jerking the line and causing the hook to enter the fish's body as he swims through the water.

Other objects and advantages will be apparent from the following description, and it will be understood that any suitable materials may be used and that changes may be made in the specific construction shown and described without departing from the spirit of the invention.

Figure 1:
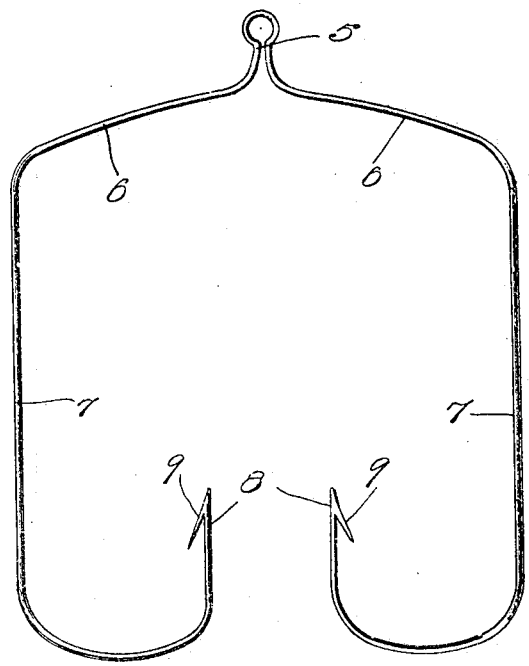
Figure 2:
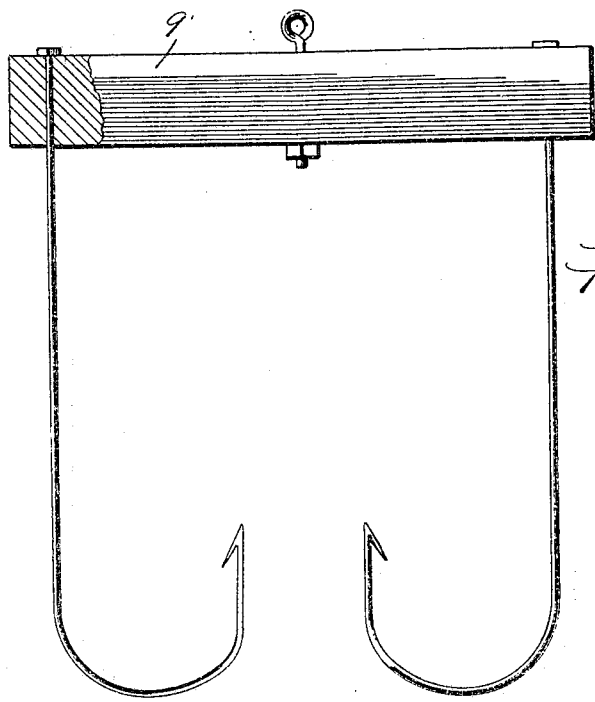

In the drawings forming a portion of this specification, and in which like numerals indicate similar parts in both views, Figure 1 is a view of the hook, showing both members thereof in elevation. Fig. 2 is a view of a modification.

Referring now to the drawings, the present invention is formed from a single piece of wire bent into a loop 5 midway between its ends, the portions at the sides of the loop extending in opposite directions, as shown at 6, and then being turned downwardly to form spaced side portions 7, the lower portions of which are turned inwardly and upwardly to form portions 8, which extend into the space between the side portions 7 and which are spaced therefrom and from each other, as shown. The portions 8 are sharpened at their free ends, and, if desired, may be provided with barbs 9. The several portions thus form an inclosure into which the sharpened portions 8 project from the bottom thereof, and when in use the device is lowered into the water and when a fish swims through the inclosure above the sharpened ends of the portions 8 a line attached to the loop 5 and by which the device is supported is suddenly jerked to cause the sharpened portions to enter the body of the fish.

What is claimed is—

1. A device of the class described comprising two hooked members, each including a shank, a bill and a connecting-bight, said bills and shanks of both members lying in a common plane and parallel to each other, the bills of both members lying between the shanks thereof and being spaced from each other, and a horizontally-extending portion connected with the ends of the shanks opposite to the bights, said horizontal portion being adapted for attachment of a line thereto.

2. A device of the class described comprising a member having transverse vertical passages formed through its ends, said member having an eye secured thereto intermediate of its ends, and two hooked members each including a shank, a bill and a connecting-bight disposed with the ends of their shanks engaged in the passages and with their bills lying between their shanks and spaced from each other, said bills being turned to extend at right angles to the member.

In testimony whereof I affix my signature in presence of two witnesses.

HALVOR TORGERSON.

Witnesses:
G. A. SEBELIUS,
OLE. HOFFOZ.